United States Patent [19]

Perez Galan

[11] Patent Number: 4,592,434

[45] Date of Patent: Jun. 3, 1986

[54] MACHINES FOR WEIGHING AND SELECTING MARKET GARDEN PRODUCE AND THE LIKE

[76] Inventor: Miguel A. Perez Galan, Camino Albalat,s/n., Alcira (Valencia), Spain

[21] Appl. No.: 610,876

[22] Filed: May 16, 1984

[30] Foreign Application Priority Data

May 17, 1983 [ES] Spain ..................................... 522463

[51] Int. Cl.[4] ..................... G01G 13/00; G01G 13/02; G01G 19/00; G01G 19/22

[52] U.S. Cl. ......................................... 177/25; 177/52; 177/119; 177/199

[58] Field of Search ..................... 177/25, 50, 52, 116, 177/119, 199, DIG. 12

[56] References Cited

U.S. PATENT DOCUMENTS

| | | | |
|---|---|---|---|
| 2,759,603 | 8/1956 | Bradley | 177/52 X |
| 3,351,145 | 11/1967 | Mumma | 177/50 X |
| 3,974,888 | 8/1976 | Murakami et al. | 177/52 |
| 4,206,822 | 6/1980 | Mazzuchelli | 177/DIG. 12 |
| 4,418,772 | 12/1983 | Fukuda | 177/25 X |
| 4,420,051 | 12/1983 | Furuta et al. | 177/25 |

*Primary Examiner*—E. A. Goldberg
*Assistant Examiner*—Patrick W. Foster
*Attorney, Agent, or Firm*—Michael J. Striker

[57] ABSTRACT

A produce weighing and selecting mechanism is disclosed where the feed system 8 is driven by a single drive means. The feed system 8 contains roller conveyors made up of rollers of discontinuous diameter alternating with rollers of constant diameter where the discontinuous rollers are rotated in a direction opposite the direction in which the conveyed objects are driven in order to sort the objects by size, before their presentation to a second transport means which presents the sorted objects singly to a third transport means. The third transport means possesses arms which gather up the singulated objects and transport them to a weigher, which possesses a slotted plate to support the object to be weighed as the arms of the third transport means pass through the slotted plate. Weighed objects are then ejected to a packaging apparatus.

6 Claims, 10 Drawing Figures

MACHINES FOR WEIGHING AND SELECTING MARKET GARDEN PRODUCE AND THE LIKE

BACKGROUND OF THE INVENTION

This invention relates to certain improvements made in machines for weighing and selecting market garden produce and the like, which bring advantages to the weighing and packaging of all types of fruit, of any shape whatever, such as round, oblong, irregular lengthening etc., and also bulbs, tubers and other produce of a similar kind.

This type of improved machine forms part of conventional packaging lines, directing and transporting the fruit and other produce being handled, while at the same time effecting the static weighing of the same in a programmed operation which adds up the unit weights of the produce to be packaged.

SUMMARY OF THE INVENTION

The improvements covered by the present invention secure the static weighing of market garden produce transported in a container specially designed for this purpose, taking account of the dimensions and shape of the fruit in question, and following the sequence and disposition of the containers as they pass through the weighing device in each packaging line, all this being achieved on an automatic and regularly repeating basis, and in multiple form and in parallel when there are a number of weighing devices.

The weighing device emits a signal which is picked up by a processor which, by deducting the tare weight of the container, which is stored in its memory, obtains automatically the weight of its content, namely, the unit weight of the fruit or produce in question. This weight is analysed by the processor, which decides the weights that are within the predetermined tolerance and, at the same time, the places at which the containers travelling on the line are to be unloaded.

This decision-making process is based on combining the unit weights of the fruit transported in each container, normally by approximation to the programmed weight, less the sum of the two unit weights which appear most frequently in the weighing sequence.

On the other hand, the processor emits signals which activate handling elements that allow the containers to be unloaded, sometimes at the fruit collection points until the predetermined weight has been reached, and at other times, when the weight of the fruit is rejected because it cannot be combined to obtain the programmed weight, unloading takes place on to a conveyor belt, which recycles the fruit within the installation.

The invention consists essentially of the units referred to hereinafter, the main functions of which are also described:

(a) A feed unit equipped with a feed hopper, the base of which is formed by a roller transporter having cylindrical rollers of discontinuous diameter alternating with other cylindrical rollers of constant diameter, their ends being joined to respective chains, to form an assembly which is operated with the aid of a driven sprocket wheel which, in turn, takes its power through the transmission from a second driven sprocket wheel, which controls the general movement of the machine. This unit forms moving feed channels conveying single items of produce, routed towards the weighing device in a sequence of one item of fruit at a time.

(b) A weighing unit which picks up the fruit delivered a piece at a time by the feed unit, deposits it on the weighing device and, when the static weighing has been effected, removes it from the weighing device and delivers it to the appropriate container.
This unit is fitted with a rotor which turns with a uniform and synchronized motion obtained through mechanical transmissions from the driven sprocket wheel and which is, at the same time, equipped with arms which gather up the fruit to prevent it from sliding in an uncontrolled manner down a series of free rollers acted on by the rotor. On the other hand, the unit is fitted with an element to accomodate produce during weighing, consisting of a slotted plate and a free-turning cylinder, in the concave part of which the fruit rests during the weighing operation, and there is also an ejector which lifts the fruit to the same level as the cylinder. This ejector is mounted on a shaft which is fitted with eccentric cams, the functioning of which is synchronized with the rotor itself. The foregoing is completed by a load cell, the top of which is fixed to a metal plate, while the bottom is fastened to a small beam tied to the framework of the machine.

(c) A container train, which keeps the containers in continuous motion, causing it to pass through the weighing unit, and thence routing it towards the successive collection points or locations and, finally, to the point where rejected fruit is unloaded.
This train is made up of a series of repeating receptacle units, fitted with prongs parallel to one another, which are concave-convex in shape, each unit being enclosed at the sides by walls, one of which has a straight upper edge, while at the bottom it is shaped to conform to the guide tracks of the installation. The other wall is practically the same, the difference being that it is extended towards the rear in the form of a tongue, to which a stud is fitted for the purpose of holding the container in the correct position during its travel. Finally, both the side walls and the prongs which carry the fruit are joined together and supported by a middle section, in which there is an opening passing through its entire length, and through which runs the supporting shaft which joins pairs of chains transversely, to form a closed system in which are situated the series of shafts of the container train.

(d) Temporary storage units, on to which the fruit is unloaded after weighing, and on which it remains until the programmed weight has been reached by adding together unit weights until the predetermined weight has been obtained. These units consist of side walls inclined away from the direction of forward movement, while there is, at the same time, another side wall, which is vertical, which prevents the fruit from falling out sideways, while the bottom is formed by a conveyor belt.

(e) A unit for the removal of fruits of insufficient weight, these being recycled by a mechanism which conveys them, in measured quantities, along a conveyor belt to other points on the chain or packaging line and, also, to the feed hopper, to repeat the process of weighing and unloading of the produce in the conditions previously established.

(f) An electronic processor which controls the various components and handling elements in terms of unit weights and their possible combinations, so as to bring about and obtain the programmed weight. Similarly, this unit is responsible for the operation which automatically deducts the tare weight in the weighing device. The unit comprises numerous electronic elements and components, which form an automatic assembly, all of them being conventional and not the subject-matter of patent.

For a better appreciation of the foregoing, drawings are attached, showing in schematic form, the invention which is hereafter described in detail, and with reference to the same.

BRIEF DESCRIPTION OF THE DRAWINGS

Finally.

Figure 1:
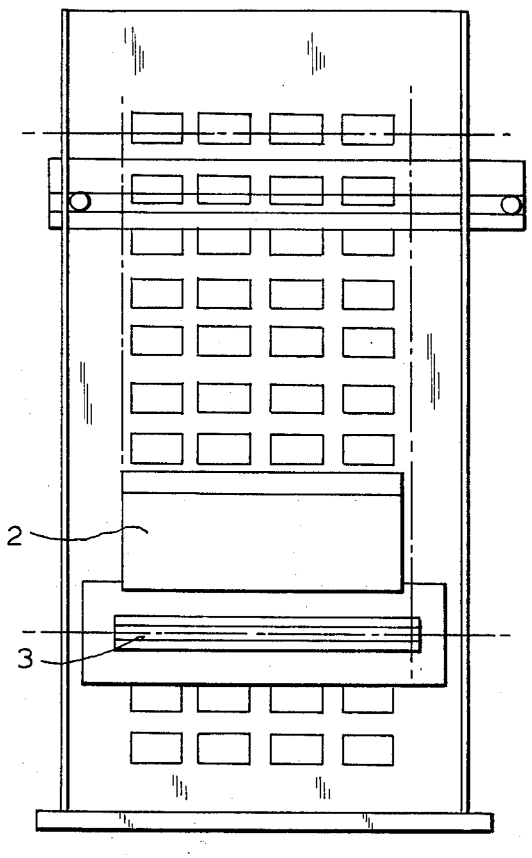
FIG. 1 represents a front view of the framework assembly containing the elements and components which make up the improvements now being proposed.
Figure 3:
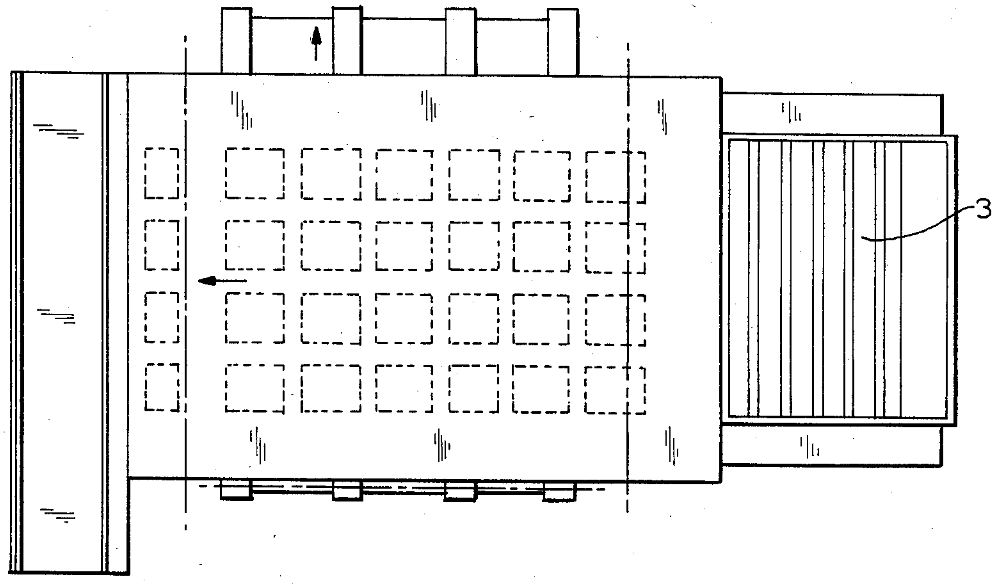
FIG. 3 is plan view of the said framework assembly, seen from above.
Figure 2:
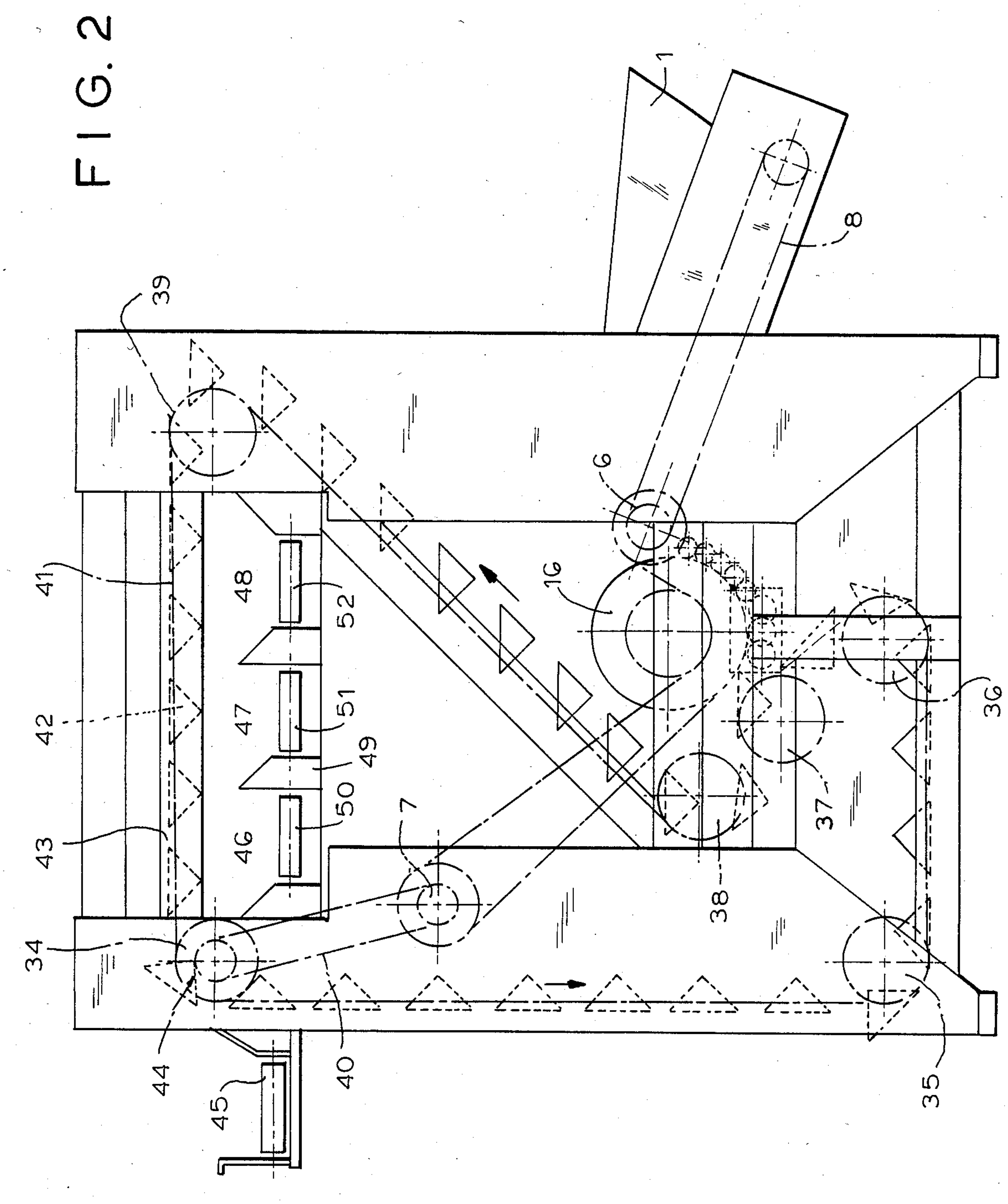
FIG. 2 is a side view of the foregoing assembly.
Figure 4:
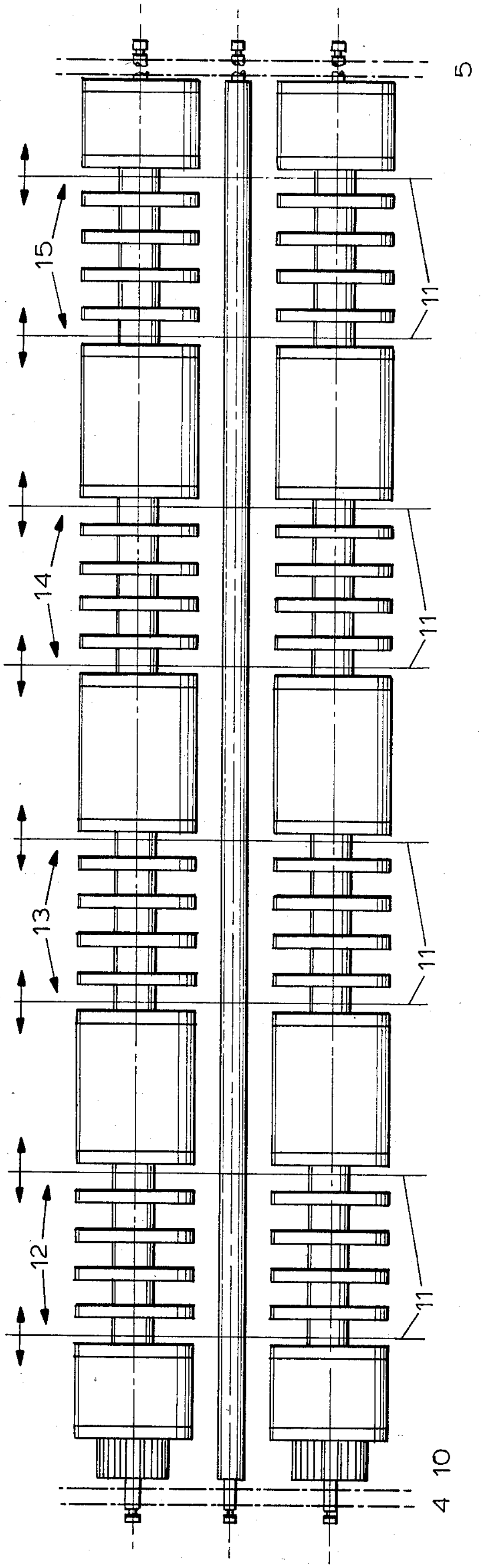
FIG. 4 shows a detail of the rollers of the feed transporter.
Figure 5:
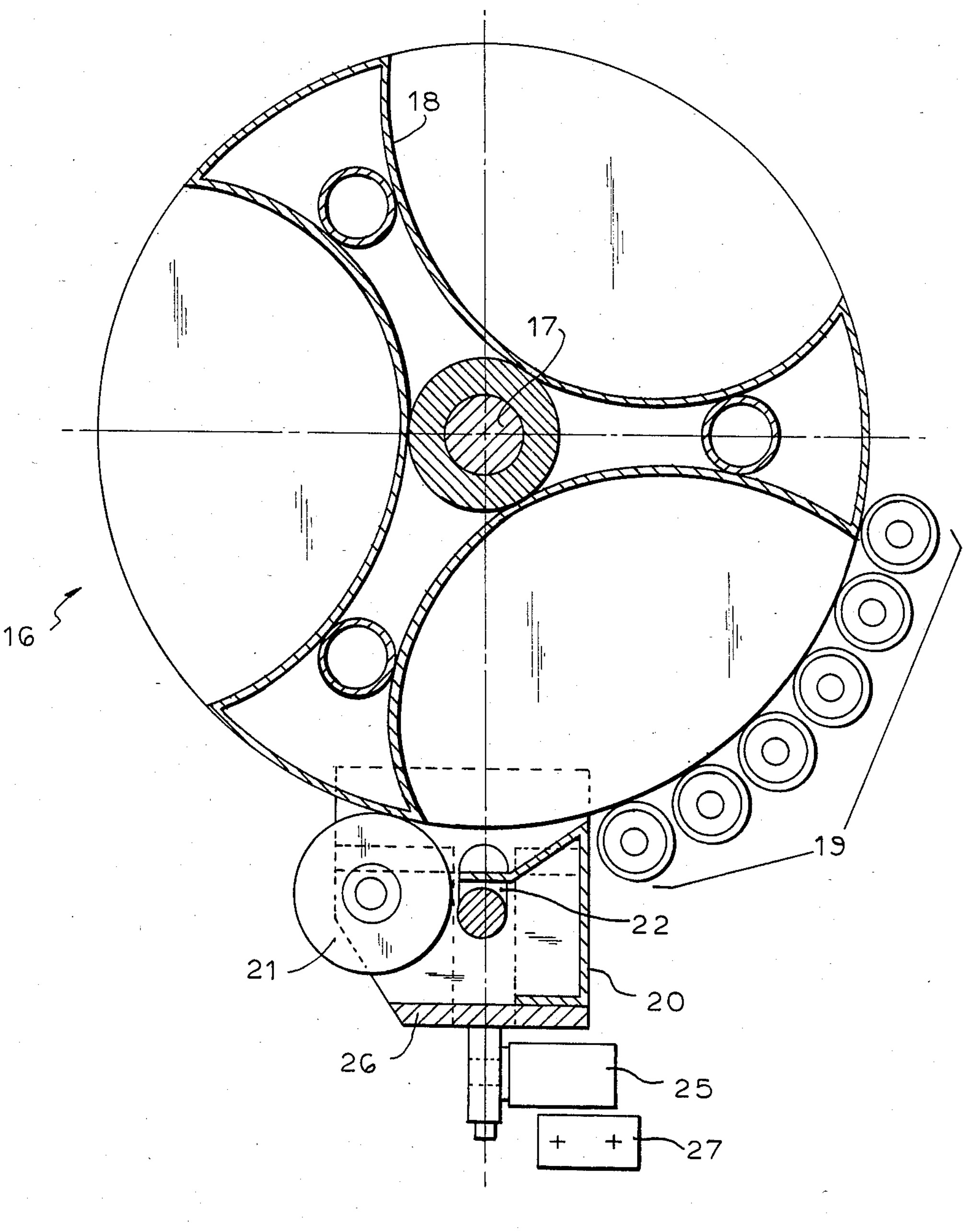
FIG. 5 shows the detail of the weighing device, in a sectional elevation view.
Figures 6, 7, 8, 9, 10:
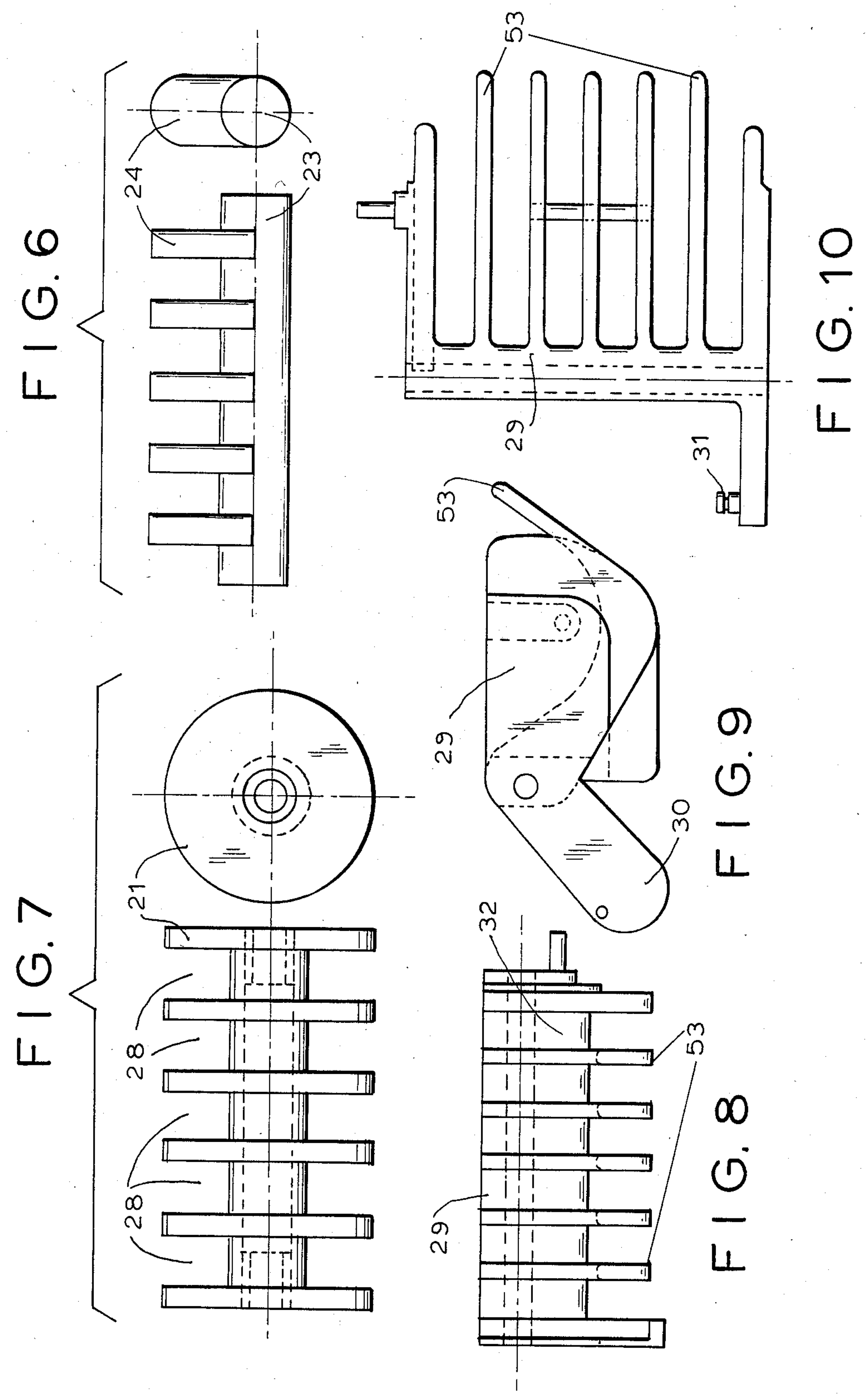
FIG. 6 shows details of the extractor cylinder of the weighing device.
FIG. 7 shows a detail of the cylinder for accomodating produce in the weighing device.
FIG. 8 is a front view of the container, showing the side opposite to the direction of travel or forward movement of the same.
FIG. 9 is a side view of the said container.
FIG. 10 shows a plan of the container, viewed from above.

According to the Figures, which are given by way of illustration and not of limitation, the improvements which are the subject-matter of the present registration comprise a feed hopper 1, 2, the bottom of which is formed by a roller conveyor with rollers of discontinuous diameter, alternating with other cylindrical rollers of constant diameter 3, all of which are joined at their ends to chains 4, 5 respectively which are driven by sprocket wheel 6 which, in turn, is driven through the transmission from sprocket wheel 7, which controls the entire feed system 8.

The rollers of discontinuous diameter are given a rotation contrary to that in which they are being driven, this motion being achieved through the friction of a gear 10 fixed to their shaft and tangential to the friction track. This rotation causes the fruit being transported to be impelled backwards in its forward progress, according to the size of the fruit, the slope of the conveyor, of the speed of rotation of the rollers and the rate of feed, while at the same time, the width of the channel is adjusted by means of plates 11, in order that the fruits may be present one at a time in those areas of the rollers where there are discs, which define and form lengths of separation 12, 13, 14 and 15.

Each of these moving channels feeds into a weighing unit 16, which has a rotor 17 which turns with a uniform and synchronized motion. This rotor is equipped with arms 18 for gathering up the fruit and preventing its uncontrolled descent over cylinders 19, which are free-running. The fruit is retained to enable it to be deposited on the element which accomodates it during weighing, this consisting of a slotted plate 20 and a free-running cylinder 21. Plate/receives/20 through its slots ejector mechanism 22 which lifts the fruit to the same level as that of cylinder 21, so that it can be pushed by the appropriate arm towards the container which is to take it. This ejector consists of a shaft 23 having eccentric cams 24.

The assembly is fixed rigidly to a transducer or load cell 25, which operates by flexion through a metal plate 26 on the upper part, while its lower part is fixed rigidly to a supporting beam 27.

Cylinder 21, which is made with discontinuous diameter, has spaces 28, being intervals between discs, where the prongs of the containers are introduced to expedite the removal of the fruit which has been weighed.

The container train consists of a series of repeating units 29, all of them having prongs 53 parallel to one another, concave-convex in shape, and in the concave areas of which is housed the fruit to be transported. These containers are closed at the sides by two walls, one of which has a straight upper edge, while at the bottom, it is appropriately shaped to ensure that it sits correctly on the guide tracks. The other wall opposite is practically the same, except that it has an extension to the rear in the form of a tongue 30, which is inclined in relation to the supporting shaft, while at the same time, it has fitted to it a stud 31, the purpose of which is to keep the container in its correct position during transit.

The unloading of the fruit is achieved by controlled tilting of the container, this tilting being possible by virtue of the fact that the prongs and the walls of the receptacle are joined together and supported by a unifying centre section 32, which has an opening 33 running through its entire length, and through which the supporting shaft passes.

The chains which pull the container train are fitted on sprocket wheels 34, 35, 36, 37, 38 and 39. The pair of driving sprocket wheels are powered through a chain 40 from the existing stepdown motor, whereas the remaining sprocket wheels, linked in pairs, are driven units.

One complete circuit of the chains causes each container to pass in turn through the assembly point corresponding to the weighing unit where the fruit is gathered up, through the point where the produce being transported is unloaded, to be stored temporarily 41, 42, 43 and through point 44, where the fruit is unloaded by gravity on to a conveyor belt 45, if it has been rejected because of insufficient weight.

The temporary storage units 46, 47 and 48 consist of side walls sloping away from the direction of forward movement, plus another side wall 49, which is vertical, to prevent the fruit from falling sideways, while the bottom consists of a conveyor belt 50. This belt and belts 51 and 52 are situated in the upper part of the machine, and underneath the container train in its upper horizontal course.

OPERATION—On starting up the machine, it may be found to be loaded, either because it has been left in that state from the previous day, or because there has been an electric power failure or some other cause or circumstance which it is unnecessary to specify. When these conditions apply, the processor emits a signal to empty all the containers prior to the one which picks up the first fruit on the unloading belt for rejected produce, at the same time it sets in motion conveyor belts 50, 51 and 52 which unload collections of fruit, even though the programmed weight has not been obtained on them, thereby initiating the weighing cycle from the beginning, with fruit being delivered to the weighing unit.

In the weighing unit, the produce is weighed and the device emits a signal which the processor analyses, to determine the weight which appears most frequently, makes the combination which is possible with the unit weights previously taken and determines the unloading point. On the other hand, the container takes up the weighed fruit, the processor having already memorized the weight of the same, and the place where the container is to be unloaded.

The container carrying combinable weights travels along and unloads by gravity at the precise place by means of a control device. The containers which are carrying rejected weights continue their travel towards unloading point 44, where they empty their contents on to conveyor belt 45, which removes them for recycling afresh.

The unloaded containers continue their downward travel so that they can begin a fresh cycle at the infeed point, that is, at the weighing unit.

Finally, when the programmed weight has been obtained at the temporary gathering points, by adding together the unit weights of the fruit, the processor emits an appropriate signal, which sets the corresponding conveyor belt in motion in the direction of the area of the machine where the collection of fruit making up the desired weight is to be removed.

Having described adequately the nature and scope of the present invention, and also a preferred embodiment thereof, it should be noted that variations are permissible in materials, form, dimensions and, in general, in all accessory and secondary details which do not alter, change or modify the essential features of the proposal.

The terms in which this specification is expressed are a true and faithful reflection of the subject-matter described, and are to be interpreted in the widest possible sense and never on the basis of restrictive criteria.

I claim:

1. In a machine for transporting, weighing and selecting market garden produce and the like, comprising an assembly of operating units which, in combination and synchronized together, form a weighing and selecting machine for fruit in general which includes a feed unit equipped with rollers which are given rotary motion and which are arranged to form a series of moving channels for feeding produce one item at a time, a container train with a plurality of containers thereon, a static weighting unit which constitutes a means of continuous and cyclical conveyance at constant speed, with removal of the fruit a piece at a time, and a transfer of the same in any direction, horizontal, vertical or inclined, while at the same time keeping horizontal each container carrying the unit of produce, temporary storage units arranged successively and transversely in the direction of forward movement of the container train on a horizontal plane situated parallel to that on which the fruit is unloaded by gravity, a base of the unit being formed by a means of horizontal conveyance which stays at rest until a predetermined weight is reached, at which point it may be set in motion to remove a collection of fruit to another machine for subsequent processing, or continue to transport it to the point of removal of fruit rejected because of insufficient weight, the improvement comprising the container train being formed by a series of transverse support shafts on two endless chains, so as to cause the train to travel in a closed circuit cycle, with the shafts moving ahead perpendicularly, although the movement in question may also be horizontal, vertical or inclined, said shafts, in their movement, draw the containers mounted on them, all of the containers having their center section traversed by an opening, inside which an axle is positioned which allows each container to be rotated and turned freely during its displacement and forward movement, each container having a series of prongs parallel to one another and each being of concave-convex shape, and all closed at the sides by two walls parallel to each other, each container being enclosed at the sides by a wall assembly, a unit for the removal of fruit of insufficient weight, and a programmable processor which automatically adjusts for the tare weight in the weighing unit, determines the average weight of the fruits and sets up combinations of the unit weights of each item of fruit, so as to coordinate the selective unloading of the same at the place predetermined in advance and memorized in the programme, while generally coordinating and controlling the operation of the machine by means of conventional handling and control devices and components.

2. The machine for weighing and selecting market garden produce and the like, as claimed in claim 1, wherein the feed unit is formed by a conveyor made up of rollers of discontinuous diameter, which are made to rotate in the opposite direction to that of the forward movement of the conveyor, alternating with rollers of constant diameter, all of them being joined transversely to a set of endless chains which form the conveyor itself, imparting to it a constant speed, while the rollers of discontinuous diameter are provided with discs which, coming into contact with the fruit, cause it to move back in the opposite direction to the forward movement, by means of which moving channels are created for feeding the fruit a piece at a time, said weight unit having a series of arms, said channels facilitating the extraction of the produce, one piece at a time, by means of the arms of the weighing unit, all this being achieved with the assistance of separator plates, the spacing apart of which can be varied, with the object of setting each channel so that it transports one fruit only.

3. The machine for weighing and selecting market garden produce and the like as claimed in claim 1, wherein the weighing unit further includes a rotor which rotates on its axis and forms, together with a set of glide cylinders, the entrance to the weighing point, which comprises a concavity formed by a slotted plate and a free-running roller, said roller being joined to a load cell situated underneath the same which, together with an extractor, formed by a shaft in association with a train of cams, lifts the fruit so that it can be pushed by the corresponding arm in a constant and uniform manner.

4. The machine for weighing and selecting market garden produce and the like, as claimed in claim 1, wherein one of said walls has its upper edge straight and its lower portion suitably shaped to allow the receptacle to be supported on guide tracks, which keep it in the correct position during its passage and forward movement, in conjunction with a fixing stud, while the other side wall, practically the same as the first mentioned, differs only in that it has a tongue-shaped extension which is inclined with respect to the axis of a transit path, having at the same time a stud, the purpose of which is the same as the one previously mentioned, the construction of each container being completed by joining together, on a functional and operational basis, all its prongs and enclosing side walls and a common rear nucleus, having an opening running through it, in which the shaft of the receptacle is positioned.

5. The machine for weighing and selecting market garden produce and the like, as claimed in claim 1, wherein the temporary storage units, where the fruit is unloaded after weighing, and in which it remains until the programmed weight has been reached, are formed by side walls sloping away from the direction of forward movement, while there is at the same time another side wall, which is vertical, to prevent the fruit from falling sideways, the bottom being formed by a produce conveyor belt.

6. The machine for weighing and selecting market garden produce and the like, as claimed in claim 1, wherein a unit is provided for the removal of fruits of insufficient weight, these being recycled by means of a measured quantity device, which conveys them in the direction of other points on the chain and, also, towards the feed hopper to repeat the process of weighing and unloading the produce, in the conditions previously established.

* * * * *